US011691910B2

(12) United States Patent
Wagner

(10) Patent No.: US 11,691,910 B2
(45) Date of Patent: *Jul. 4, 2023

(54) SOLAR CONTROL COATING WITH HIGH SOLAR HEAT GAIN COEFFICIENT

(71) Applicant: Vitro Flat Glass LLC, Cheswick, PA (US)

(72) Inventor: Andrew V. Wagner, Pittsburgh, PA (US)

(73) Assignee: Vitro Flat Glass LLC, Cheswick, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/534,627

(22) Filed: Nov. 24, 2021

(65) Prior Publication Data
US 2022/0081354 A1    Mar. 17, 2022

Related U.S. Application Data

(63) Continuation of application No. 12/774,751, filed on May 6, 2010, now Pat. No. 11,198,641.
(Continued)

(51) Int. Cl.
    *C03C 17/36*    (2006.01)
(52) U.S. Cl.
    CPC .......... *C03C 17/36* (2013.01); *C03C 17/366* (2013.01); *C03C 17/3618* (2013.01);
    (Continued)
(58) Field of Classification Search
    CPC . C03C 17/34; C03C 17/3411; C03C 17/3417; C03C 17/3429; C03C 17/36;
    (Continued)

(56) References Cited

U.S. PATENT DOCUMENTS

| 4,193,236 A | 3/1980 | Mazzoni et al. |
| 4,379,040 A | 4/1983 | Gillery |

(Continued)

FOREIGN PATENT DOCUMENTS

| CA | 2741875 A1 * | 5/2010 | ........... C03C 17/002 |
| CN | 86108656 A | 9/1987 | |

(Continued)

OTHER PUBLICATIONS

International Search Report, PCT/US2010/033809, filed May 6, 2010.

*Primary Examiner* — Megha M Gaitonde
(74) *Attorney, Agent, or Firm* — The Webb Law Firm

(57) ABSTRACT

A coating provides a high solar heat gain coefficient (SHGC) and a low overall heat transfer coefficient (U-value) to trap and retain solar heat. The coating and coated article are particularly useful for use in architectural transparencies in northern climates. The coating includes a first dielectric layer; a continuous metallic layer formed over at least a portion of the first dielectric layer, the metallic layer having a thickness less than 8 nm; a primer layer formed over at least a portion of the metallic layer; a second dielectric layer formed over at least a portion of the primer layer; and an overcoat formed over at least a portion of the second dielectric layer. When used on a No. 3 surface of a reference IGU, the coating provides a SHGC of greater than or equal to 0.6 and a U-value of less than or equal to 0.35.

13 Claims, 2 Drawing Sheets

Related U.S. Application Data

(60) Provisional application No. 61/176,534, filed on May 8, 2009.

(52) U.S. Cl.
CPC ...... *C03C 17/3644* (2013.01); *C03C 17/3652* (2013.01); *C03C 17/3681* (2013.01); *C03C 17/3689* (2013.01); *Y10T 428/2495* (2015.01); *Y10T 428/265* (2015.01)

(58) Field of Classification Search
CPC ............ C03C 17/3602; C03C 17/3607; C03C 17/3618; C03C 17/3639; C03C 17/3644; C03C 17/3652; C03C 17/366; C03C 17/3657; C03C 17/3681; Y10T 428/24942; Y10T 428/2495
USPC .......................................... 428/98, 141, 142
See application file for complete search history.

(56) References Cited

U.S. PATENT DOCUMENTS

| | | | |
|---|---|---|---|
| 4,464,874 A | 8/1984 | Shea, Jr. et al. | |
| 4,466,562 A | 8/1984 | DeTorre | |
| 4,671,155 A | 6/1987 | Goldinger | |
| 4,716,086 A | 12/1987 | Gillery et al. | |
| 4,746,347 A | 5/1988 | Sensi | |
| 4,792,536 A | 12/1988 | Pecoraro et al. | |
| 4,861,669 A | 8/1989 | Gillery | |
| 4,898,789 A | 2/1990 | Finley | |
| 4,898,790 A | 2/1990 | Finley | |
| 4,900,633 A | 2/1990 | Gillery | |
| 4,920,006 A | 4/1990 | Gillery | |
| 4,938,857 A | 7/1990 | Gillery | |
| 5,030,593 A | 7/1991 | Heithoff | |
| 5,030,594 A | 7/1991 | Heithoff | |
| 5,088,258 A | 2/1992 | Schield et al. | |
| 5,106,663 A | 4/1992 | Box | |
| 5,240,886 A | 8/1993 | Gulotta et al. | |
| 5,328,768 A | 7/1994 | Goodwin | |
| 5,385,872 A | 1/1995 | Gulotta et al. | |
| 5,393,593 A | 2/1995 | Gulotta et al. | |
| 5,492,750 A | 2/1996 | Schumaker, Jr. et al. | |
| 5,942,338 A | 8/1999 | Arbab et al. | |
| 6,833,194 B1 | 12/2004 | O'Shaughnessy | |
| 6,869,644 B2 | 3/2005 | Buhay et al. | |
| 6,916,542 B2 | 7/2005 | Buhay et al. | |
| 6,962,759 B2 | 11/2005 | Buhay et al. | |
| 7,311,961 B2 | 12/2007 | Finley et al. | |
| 8,686,319 B2 | 4/2014 | Thiel | |
| 2002/0136905 A1* | 9/2002 | Medwick ............ C03C 17/3618 428/432 |
| 2002/0172775 A1 | 11/2002 | Buhay et al. | |
| 2003/0180547 A1 | 9/2003 | Buhay et al. | |
| 2003/0228476 A1 | 12/2003 | Buhay et al. | |
| 2007/0218262 A1 | 9/2007 | Degand et al. | |
| 2008/0277320 A1 | 11/2008 | Thiel | |

FOREIGN PATENT DOCUMENTS

| | | |
|---|---|---|
| EP | 0803481 A2 | 10/1997 |
| WO | 03068500 A1 | 8/2003 |

\* cited by examiner

SOLAR CONTROL COATING WITH HIGH SOLAR HEAT GAIN COEFFICIENT

CROSS-REFERENCE TO RELATED APPLICATIONS

This application is a continuation of U.S. patent application Ser. No. 12/774,751, filed on May 6, 2010, which claims priority to U.S. Patent Application Ser. No. 61/176,534, filed May 8, 2009, the disclosures of which are herein incorporated by reference in their entireties.

BACKGROUND OF THE INVENTION

Field of the Invention

This invention relates generally to solar control coatings and, in one particular embodiment, to a solar control coating providing a high solar heat gain coefficient (SHGC) and a low overall heat transfer coefficient (U-value).

Technical Considerations

The SHGC is the fraction of incident solar radiation admitted through a window, both directly transmitted, and absorbed and subsequently released inwardly. The lower the SHGC, the less solar heat is transmitted. The U-value is a measure of the rate of non-solar heat loss or gain through a material. The lower the U-value, the greater the resistance to heat flow and the better the insulating value.

Solar control coatings are known in the fields of architectural and automotive transparencies. These solar control coatings block or filter selected ranges of electromagnetic radiation, such as in the range of solar infrared or solar ultraviolet radiation, to reduce the amount of solar energy entering the vehicle or building. This reduction of solar energy transmittance helps reduce the load on the cooling units of the vehicle or building, particularly in the summer months. Conventional solar control coatings typically provide a relatively low SHGC.

While low SHGC coatings are advantageous in southern climates, they may not be as desirable in northern climates. For northern climates, it may be more energy efficient to have windows with a higher SHGC to trap more heat from the sun inside the building during the winter months. This is particularly true in northern climates where the cooler days of fall and winter weather outnumber the warmer days of spring and summer.

Therefore, it would be desirable to provide a coating and/or coated article that improves the energy efficiency of a building in a northern climate where the desire is to trap heat from the sun inside the building. The coating and/or coated article can have a low emissivity to give a low U-value while having a high SHGC so as to let more solar heat into the building and keep it there.

SUMMARY OF THE INVENTION

A coating provides a high solar heat gain coefficient (SHGC) and a low overall heat transfer coefficient (U-valve) to trap and retain solar heat. The coating and coated article are particularly useful for architectural transparencies in northern climates.

A coated transparency comprises a substrate and a coating formed over at least a portion of the substrate. The coating comprises a first dielectric layer formed over at least a portion of the substrate; a continuous metallic layer formed over at least a portion of the first dielectric layer, the metallic layer having a thickness less than 8 nm; a primer layer formed over at least a portion of the metallic layer; a second dielectric layer formed over at least a portion of the primer layer; and an overcoat formed over at least a portion of the second dielectric layer. The coating, when used on the No. 3 surface of a reference IGU, provides a SHGC of greater than or equal to 0.6 and a U-value of less than or equal to 0.35.

In one exemplary coating, the first dielectric layer has a thickness in the range of 40 nm to 50 nm. The first dielectric layer comprises a zinc oxide film deposited over a zinc stannate film, the zinc oxide film has a thickness in the range of 3 nm to 15 nm, and the zinc stannate film has a thickness in the range of 25 nm to 40 nm. The metallic layer comprises silver having a thickness less than or equal to 7.5 nm. The primer layer comprises titanium. The second dielectric layer has a thickness in the range of 30 nm to 40 nm. The second dielectric layer comprises a zinc oxide film and a zinc stannate film deposited over the zinc oxide film. The zinc oxide film has a thickness in the range of 3 nm to 15 nm. The overcoat has a thickness in the range of 2 nm to 6 nm and comprises titania. The coating, when used on the No. 3 surface of a reference IGU, provides a SHGC of greater than or equal to 0.6, such as greater than or equal to 0.65 and a U-value of less than or equal to 0.35, such as less than or equal to 0.33.

In another exemplary coating, the first dielectric layer comprises a first layer comprising zinc stannate, a second layer comprising zinc oxide, a third layer comprising zinc stannate, and a fourth layer comprising zinc oxide, wherein the first dielectric layer has a thickness in the range of 44 nm to 48 nm, the first layer and third layer each have a thickness in the range of 16 nm to 17 nm, and the second layer and fourth layer each have a thickness in the range of 6 nm to 8 nm. The metallic layer comprises silver having a thickness less than or equal to 7 nm. The primer layer comprises titanium. The second dielectric layer comprises a first layer comprising zinc oxide, a second layer comprising zinc stannate, a third layer comprising zinc oxide, and a fourth layer comprising zinc stannate, wherein the second dielectric layer has a thickness in the range of 30 nm to 35 nm, the first layer and third layer each have a thickness in the range of 3 nm to 5 nm, and the second layer and fourth layer each have a thickness in the range of 11 nm to 12 nm. The overcoat has a thickness in the range of 5 nm to 10 nm and comprises titania. The coating, when used on the No. 3 surface of a reference IGU, provides a SHGC of greater than or equal to 0.6, such as greater than or equal to 0.65 and a U-value of less than or equal to 0.35, such as less than or equal to 0.33.

An insulating glass unit comprises a first substrate having a No. 1 surface and a No. 2 surface, and a second substrate spaced from the first substrate and having a No. 3 surface and a No. 4 surface, with the No. 3 surface facing the No. 2 surface. A coating is formed over at least a portion of the No. 3 surface. The coating comprises a first dielectric layer formed over at least a portion of the substrate; a continuous metallic layer formed over at least a portion of the first dielectric layer, wherein the metallic layer comprises silver having a thickness less than or equal to 7.5 nm; a primer layer formed over at least a portion of the metallic layer, wherein the primer film comprises titanium; a second dielectric layer formed over at least a portion of the primer layer; and an overcoat formed over at least a portion of the second dielectric layer. The insulating glass unit has a SHGC of greater than or equal to 0.6, such as greater than or equal to 0.65 and a U-value of less than or equal to 0.35, such as less than or equal to 0.33. In one example, the first dielectric layer has a thickness in the range of 40 nm to 50 nm, the first dielectric layer comprises a zinc oxide film deposited over a zinc stannate film, the zinc oxide film has a thickness in the range of 3 nm to 15 nm, and the zinc stannate film has a thickness in the range of 25 nm to 40 nm. The metallic layer comprises silver having a thickness less than or equal to 7.5 nm. The primer film comprises titanium. The second dielectric layer comprises a zinc oxide film and a zinc stannate film deposited over the zinc oxide film, the second dielectric layer has a thickness in the range of 30 nm to 40 nm, and the zinc oxide film has a thickness in the range of 3 nm to 15 nm. The overcoat has a thickness in the range of 2 nm to 6 nm and comprises titania. In another insulating glass unit, the first dielectric layer comprises a first layer comprising zinc stannate, a second layer comprising zinc oxide, a third layer comprising zinc stannate, and a fourth layer comprising zinc oxide, wherein the first dielectric layer has a thickness in the range of 44 nm to 48 nm, the first layer and third layer each have a thickness in the range of 16 nm to 17 nm, and the second layer and fourth layer each have a thickness in the range of 6 nm to 8 nm. The metallic layer comprises silver having a thickness less than or equal to 7 nm. The primer film comprises titanium. The second dielectric layer comprises a first layer comprising zinc oxide, a second layer comprising zinc stannate, a third layer comprising zinc oxide, and a fourth layer comprising zinc stannate, wherein the second dielectric layer has a thickness in the range of 30 nm to 35 nm, the first layer and third layer each have a thickness in the range of 3 nm to 5 nm, and the second layer and fourth layer each have a thickness in the range of 11 nm to 12 nm. The overcoat has a thickness in the range of 5 nm to 10 nm and comprises titania.

Another insulating glass unit comprises a first substrate having a No. 1 surface and a No. 2 surface; a second substrate spaced from the first substrate and having a No. 3 surface and a No. 4 surface, with the No. 3 surface facing the No. 2 surface; and a third substrate spaced from the second substrate and having a No. 4 surface and a No. 5 surface. A first coating is formed over at least a portion of the No. 5 surface. The first coating comprises a first dielectric layer formed over at least a portion of the substrate; a continuous metallic layer formed over at least a portion of the first dielectric layer; a primer layer formed over at least a portion of the metallic layer; a second dielectric layer formed over at least a portion of the primer layer; and an overcoat formed over at least a portion of the second dielectric layer, wherein the overcoat has a thickness in the range of 2 nm to 6 nm and the overcoat comprises titania. A second coating is formed over at least a portion of the No. 2 surface, the second coating comprising at least two metallic silver layers separated by dielectric layers. The insulating glass unit has a SHGC of greater than or equal to 0.6, such as greater than or equal to 0.65 and a U-value of less than or equal to 0.35, such as less than or equal to 0.33. In one example, the first dielectric layer of the first coating has a thickness in the range of 40 nm to 50 nm, the first dielectric layer comprises a zinc oxide film deposited over a zinc stannate film, the zinc oxide film has a thickness in the range of 3 nm to 15 nm, and the zinc stannate film has a thickness in the range of 25 nm to 40 nm. The metallic layer of the first coating comprises silver having a thickness less than or equal to 7.5 nm. The primer film of the first coating comprises titanium. The second dielectric layer of the first coating comprises a zinc oxide film and a zinc stannate film deposited over the zinc oxide film, the second dielectric layer has a thickness in the range of 30 nm to 40 nm, and the zinc oxide film has a thickness in the range of 3 nm to 15 nm. The overcoat of the first coating has a thickness in the range of 2 nm to 6 nm and comprises titania. In another example, the first dielectric layer of the first coating comprises a first layer comprising zinc stannate, a second layer comprising zinc oxide, a third layer comprising zinc stannate, and a fourth layer comprising zinc oxide, wherein the first dielectric layer has a thickness in the range of 44 nm to 48 nm, the first layer and third layer each have a thickness in the range of 16 nm to 17 nm, and the second layer and fourth layer each have a thickness in the range of 6 nm to 8 nm. The metallic layer of the first coating comprises silver having a thickness less than or equal to 7 nm. The primer film of the first coating comprises titanium. The second dielectric layer of the first coating comprises a first layer comprising zinc oxide, a second layer comprising zinc stannate, a third layer comprising zinc oxide, and a fourth layer comprising zinc stannate, wherein the second dielectric layer has a thickness in the range of 30 nm to 35 nm, the first layer and third layer each have a thickness in the range of 3 nm to 5 nm, and the second layer and fourth layer each have a thickness in the range of 11 nm to 12 nm. The overcoat of the first coating has a thickness in the range of 5 nm to 10 nm and the overcoat comprises titania.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
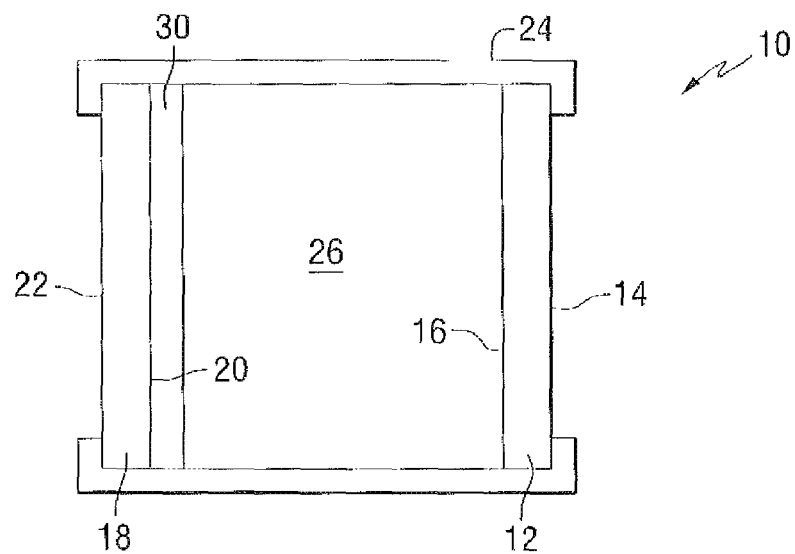
FIG. 1 is a side view (not to scale) of an insulating glass unit (IGU) having a coating of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". U-values herein are expressed for NFRC/ASHRAE winter conditions of 0° F. (−18° C.) outdoor temperature, 70° F. (21° C.) indoor temperature, 15 miles per hour wind, and no solar load.

For purposes of the following discussion, the invention will be discussed with reference to use with an architectural transparency, such as, but not limited to, an insulating glass unit (IGU). As used herein, the term "architectural transparency" refers to any transparency located on a building, such as, but not limited to, windows and sky lights. However, it is to be understood that the invention is not limited to use with such architectural transparencies but could be practiced with transparencies in any desired field, such as, but not limited to, laminated or non-laminated residential and/or commercial windows, and/or transparencies for land, air, space, above water and under water vehicles. Therefore, it is to be understood that the specifically disclosed exemplary embodiments are presented simply to explain the general concepts of the invention and that the invention is not limited to these specific exemplary embodiments. Additionally, while a typical "transparency" can have sufficient visible light transmission such that materials can be viewed through the transparency, in the practice of the invention the "transparency" need not be transparent to visible light but may be translucent or opaque (as described below).

A non-limiting transparency 10 incorporating features of the invention is illustrated in FIG. 1. The transparency 10 can have any desired visible light, infrared radiation, or ultraviolet radiation transmission and/or reflection. For example, the transparency 10 can have a visible light transmission of any desired amount, e.g., greater than 0% up to 100%.

The exemplary transparency 10 of FIG. 1 is in the form of a conventional two-ply insulating glass unit and includes a first ply 12 with a first major surface 14 (No. 1 surface) and an opposed second major surface 16 (No. 2 surface). In the illustrated non-limiting embodiment, the first major surface 14 faces the building exterior, i.e., is an outer major surface, and the second major surface 16 faces the interior of the building. The transparency 10 also includes a second ply 18 having an outer (first) major surface 20 (No. 3 surface) and an inner (second) major surface 22 (No. 4 surface) and spaced from the first ply 12. This numbering of the ply surfaces is in keeping with conventional practice in the fenestration art. The first and second plies 12, 18 can be connected together in any suitable manner, such as by being adhesively bonded to a conventional spacer frame 24. A gap or chamber 26 is formed between the two plies 12, 18. The chamber 26 can be filled with a selected atmosphere, such as air, or a non-reactive gas, such as argon or krypton gas. A solar control coating 30 of the invention is formed over at least a portion of one of the plies 12, 18, such as, but not limited to, over at least a portion of the No. 2 surface 16 or at least a portion of the No. 3 surface 20. Although, the coating could also be on the No. 1 surface or the No. 4 surface, if desired. Examples of insulating glass units are found, for example, in U.S. Pat. Nos. 4,193,236; 4,464,874; 5,088,258; and 5,106,663.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmission of greater than 0% up to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The first and second plies 12, 18 can each be, for example, clear float glass or can be tinted or colored glass or one ply 12, 18 can be clear glass and the other ply 12, 18 colored glass. Although not limiting to the invention, examples of glass suitable for the first ply 12 and/or second ply 18 are described in U.S. Pat. Nos. 4,746,347; 4,792,536; 5,030,593; 5,030,594; 5,240,886; 5,385,872; and 5,393,593. The first and second plies 12, 18 can be of any desired dimensions, e.g., length, width, shape, or thickness. In one exemplary transparency, the first and second plies can each be 1 mm to 10 mm thick, such as 1 mm to 8 mm thick, such as 2 mm to 8 mm, such as 3 mm to 7 mm, such as 5 mm to 7 mm, such as 6 mm thick. Non-limiting examples of glass that can be used for the practice of the invention include clear glass, Starphire®, Solargreen®, Solextra®, GL-20®, GL35™, Solarbronze®, Solargray® glass, Pacifica® glass, SolarBlue® glass, Solarphire® glass, Solarphire PV® glass, and Optiblue® glass, all commercially available from PPG Industries Inc. of Pittsburgh, Pa.

The coating 30 of the invention is deposited over at least a portion of at least one major surface of one of the glass plies 12, 18. In the example shown in FIG. 1, the coating 30 is formed over at least a portion of the outer surface 20 of the inboard glass ply 18. The coating 30 is configured to be a low emissivity coating that admits and retains solar heat.

The coating 30 can be deposited by any conventional method, such as, but not limited to, conventional chemical vapor deposition (CVD) and/or physical vapor deposition (PVD) methods. Examples of PVD processes include thermal or electron beam evaporation and vacuum sputtering (such as magnetron sputter vapor deposition (MSVD)). Other coating methods could also be used, such as, but not limited to, sol-gel deposition. In one non-limiting embodiment, the coating 30 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

Figure 2:
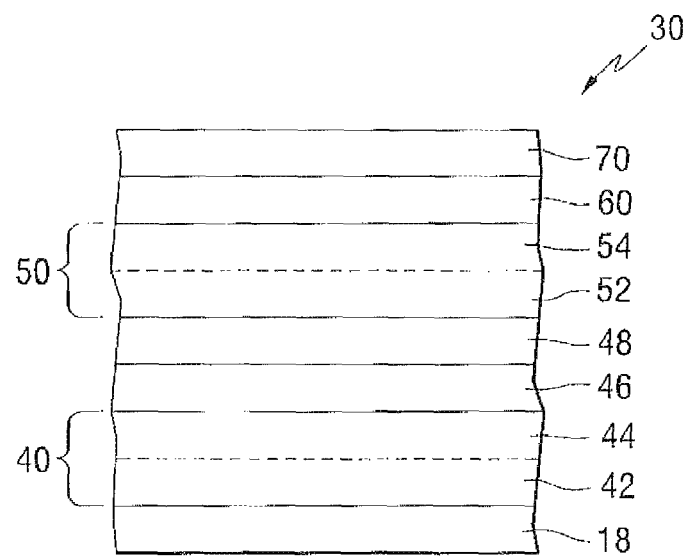
FIG. 2 is a side view (not to scale) of a coating incorporating features of the invention.

An exemplary non-limiting coating 30 of the invention is shown in FIG. 2. This exemplary coating 30 includes a base layer or first dielectric layer 40 deposited over at least a portion of a major surface of a substrate (e.g., the No. 3 surface 20 of the second ply 18). The first dielectric layer 40 can be a single layer or can comprise more than one film of antireflective materials and/or dielectric materials, such as, but not limited to, metal oxides, oxides of metal alloys, nitrides, oxynitrides, or mixtures thereof. The first dielectric layer 40 can be transparent to visible light. Examples of suitable metal oxides for the first dielectric layer 40 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 40 can be a substantially single phase film, such as a metal alloy oxide film, e.g., zinc stannate, or can be a mixture of phases composed of zinc and tin oxides or can be composed of a plurality of films.

The first dielectric layer 40 (whether a single film or multiple film layer) can have a thickness in the range of 20 nanometers (nm) to 70 nm, such as 20 nm to 60 nm, such as 30 nm to 60 nm, such as 40 nm to 55 nm, such as 44 nm to 46 nm, such as 45 nm.

As shown in FIG. 2, the first dielectric layer 40 can comprise a multi-film structure having a first film 42, e.g., a metal alloy oxide film, deposited over at least a portion of a substrate (such as the outer major surface 20 of the second ply 18) and a second film 44, e.g., a metal oxide or oxide mixture film, deposited over the first metal alloy oxide film 42. In one non-limiting embodiment, the first film 42 can be a zinc/tin alloy oxide. By "zinc/tin alloy oxide" is meant both true alloys and also mixtures of the oxides. The zinc/tin alloy oxide can be that obtained from magnetron sputtering vacuum deposition from a cathode of zinc and tin. One non-limiting cathode can comprise zinc and tin in proportions of 5 wt. % to 95 wt. % zinc and 95 wt. % to 5 wt. % tin, such as 10 wt. % to 90 wt. % zinc and 90 wt. % to 10 wt. % tin. However, other ratios of zinc to tin could also be used. One suitable metal alloy oxide that can be present in the first film 42 is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. For example, where x=2/3, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film.

The second film 44 can be a metal oxide film, such as zinc oxide containing film. The zinc oxide film can be deposited from a zinc cathode that includes other materials to improve the sputtering characteristics of the cathode. For example, the zinc cathode can include a small amount (e.g., up to 10 wt. %, such as up to 5 wt. %) of tin to improve sputtering. In which case, the resultant zinc oxide film would include a small percentage of tin oxide, e.g., up to 10 wt. % tin oxide, e.g., up to 5 wt. % tin oxide. A coating layer deposited from a zinc cathode having up to 10 wt. % tin (added to enhance the conductivity of the cathode) is referred to herein as "a zinc oxide film" even though a small amount of tin may be present. The small amount of tin in the cathode (e.g., less than or equal to 10 wt. %, such as less than or equal to 5 wt. %) is believed to form tin oxide in the predominantly zinc oxide second film 44.

The first film 42 can comprise zinc stannate having a thickness in the range of 20 nm to 60 nm, such as 25 nm to 50 nm, such as 35 nm to 40 nm. The second film 44 can comprise zinc oxide (for example, 90 wt. % zinc oxide and 10 wt. % tin oxide) having a thickness in the range of 3 nm to 15 nm, such as 5 nm to 10 nm.

A heat and/or radiation reflective metallic layer 46 can be deposited over the first dielectric layer 40. The reflective layer 46 can include a reflective metal, such as, but not limited to, gold, copper, platinum, osmium, titanium, nickel, chromium, palladium, aluminum, silver, or mixtures, alloys, or combinations thereof. In one embodiment, the reflective layer 46 comprises a metallic silver layer having a thickness in the range of 3 nm to 8 nm, such as 4 nm to 8 nm, such as 5 nm to 7 nm, such as 6 nm to 7 nm. The metallic layer 46 is a continuous layer.

A first primer layer 48 is located over the reflective layer 46. The first primer layer 48 can be a single film or a multiple film layer. The first primer layer 48 can include an oxygen-capturing material that can be sacrificial during the deposition process to prevent degradation or oxidation of the first reflective layer 46 during the sputtering process or subsequent heating processes. Examples of materials useful for the first primer layer 48 include metals or oxides of metals, such as titanium, zirconium, copper, nickel, chromium, aluminum; silicon, silicon dioxide, silicon nitride, silicon oxynitride, nickel-chrome alloys (such as Inconel), zirconium, aluminum, alloys of silicon and aluminum, alloys containing cobalt and chromium (e.g., Stellite), and mixtures thereof. For example, the first primer layer 48 can be titanium having a thickness in the range of 0.5 to 3 nm, such as 0.5 to 2 nm, such as 1 nm to 2 nm, such as 1.4 nm.

For the primer layer 48, it should be appreciated that the layer is formed by first depositing a metal. At least a portion of the metal is oxidized during further processing of the coating 30. In the case of an annealed coating (Examples 1 and 3 below), the titanium primer layer is oxidized during subsequent deposition of overlying oxide layers. In the case of a temperable coating (Examples 2 and 4 below), a portion of the titanium is oxidized during subsequent deposition of oxide layers and the remainder is oxidized upon tempering.

A second dielectric layer 50 is located over the reflective layer 46 (e.g., over the first primer layer 48). The second dielectric layer 50 comprises one or more metal oxide or metal alloy oxide-containing films, such as those described above with respect to the first dielectric layer 40. For example, the second dielectric layer 50 can include a first metal oxide film 52, e.g., a zinc oxide film (for example, 90 wt. % zinc oxide and 10 wt. % tin oxide), deposited over the first primer film 48 and a second metal alloy oxide film 54, e.g., a zinc stannate film, deposited over the first zinc oxide film 52.

The second dielectric layer 50 can have a total thickness (e.g., the combined thicknesses of the layers) in the range of 10 nm to 50 nm, such as 20 nm to 50 nm, such as 30 nm to 50 nm, such as 30 nm to 40 nm, such as 35 nm to 40 nm, such as 36.2 nm.

For example, the zinc oxide film 52 can have a thickness in the range of 3 nm to 15 nm, such as 5 nm to 10 nm. The metal alloy oxide layer (zinc stannate) 54 can have a thickness in the range of 15 nm to 35 nm, such as 20 nm to 35 nm, such as 21 nm to 31 nm.

An overcoat 60 can be located over the second dielectric layer 50. The overcoat 60 can help protect the underlying coating layers from mechanical and chemical attack. The overcoat 60 can be, for example, one or more metal oxide or metal nitride layers. Examples of suitable materials include oxides and/or nitrides of silicon, titanium, aluminum, zirconium, and mixtures thereof, for example a mixture of silica and alumina. For example, the overcoat 60 can be titania having a thickness in the range of 1 nm to 10 nm, such as 2 nm to 8 nm, such as 4 nm to 6 nm, such as 5 nm.

The coating 30 can also include an optional protective coating 70. The protective coating 70 assists in protecting the underlying layers from mechanical and chemical attack during manufacture, transit, handling, processing, and/or during the mirror's service life in the field. The protective coating 70 also helps protect the underlying layers from the ingress of liquid water, water vapor, and other environmental pollutants (be they solid, liquid or gas).

The protective coating 70 can be an oxygen barrier coating layer to prevent or reduce the passage of ambient oxygen into the underlying layers during subsequent processing, e.g., such as during heating or bending. The protective coating 70 can be of any desired material or mixture of materials, such as, but not limited to, one or more inorganic materials. In one exemplary embodiment, the protective coating 70 can include a layer having one or more metal oxide materials, such as, but not limited to, oxides of aluminum, silicon, or mixtures thereof. For example, the protective coating 70 can be a single coating layer comprising silica, alumina, or mixtures thereof. For example, the protective coating 70 can include silica and alumina in the range of 70 wt. % to 99 wt. % silica and 1 wt. % to 30 wt. % alumina, such as 75 wt. % to 90 wt. % silica and 25 wt. % to 10 wt. % alumina, such as 80 wt. % to 90 wt. % silica and 20 wt. % to 10 wt. % alumina, such as 85 wt. % to 90 wt. % silica and 15 wt. % to 10 wt. % alumina, In one particular non-limiting embodiment, the protective coating 70 comprises 85 wt. % silica and 15 wt. % alumina. Other materials, such as aluminum, chromium, hafnium, yttrium, nickel, boron, phosphorous, titanium, zirconium, and/or oxides thereof, can also be present, such as to adjust the refractive index of the protective coating 70. The protective coating 70 can be of non-uniform thickness. By "non-uniform thickness" is meant that the thickness of the protective coating 70 can vary over a given unit area, e.g., the protective coating 70 can have high and low spots or areas. The protective coating 70 can have a thickness in the range of 1 nm to 1,000 nm, such as 10 nm to 500 nm, such as 20 nm to 300 nm, such as 50 nm to 300 nm, e.g., 50 nm to 200 nm, such as 50 nm to 150 nm, such as 50 nm to 120 nm, such as 75 nm to 120 nm such as 75 nm to 100 nm. In a particular non-limiting embodiment, the protective coating 50 can have a thickness of at least 50 nm, such as at least 75 nm, such as at least 100 nm, such as at least 110 nm, such as at least 120 nm, such as at least 150 nm, such as at least 200 nm.

In another non-limiting embodiment, the protective coating 70 can comprise a multi-layer structure, e.g., a first layer with at least one second layer formed over the first layer. In one specific non-limiting embodiment, the first layer can comprise alumina or a mixture or alloy comprising alumina and silica. For example, the first layer can comprise a silica and alumina mixture having greater than 5 wt. % alumina, such as greater than 10 wt. % alumina, such as greater than 15 wt. % alumina, such as greater than 30 wt. % alumina, such as greater than 40 wt. % alumina, such as 50 wt. % to 70 wt. % alumina, such as in the range of 70 wt. % to 100 wt. % alumina and 30 wt. % to 0 wt. % silica, such as greater than 90 wt. % alumina, such as greater than 95 wt. % alumina. In one non-limiting embodiment, the first layer comprises all or substantially all alumina. The first layer can have a thickness in the range of greater than 0 nm to 1 micron, such as 5 nm to 10 nm, such as 10 nm to 25 nm, such as 10 nm to 15 nm. The second layer can comprise silica or a mixture or alloy comprising silica and alumina. For example, the second layer can comprise a silica and alumina mixture having greater than 40 wt. % silica, such as greater than 50 wt. % silica, such as greater than 60 wt. % silica, such as greater than 70 wt. % silica, such as greater than 80 wt. % silica, such as in the range of 80 wt. % to 90 wt. % silica and 10 wt. % to 20 wt. % alumina, e.g., 85 wt. % silica and 15 wt. % alumina. The second layer can have a thickness in the range of greater than 0 nm to 2 microns, such as 5 nm to 500 nm, such as 5 nm to 200 nm, such as 10 nm to 100 nm, such as 30 nm to 50 nm, such as 35 nm to 40 nm. In another non-limiting embodiment, the second layer can have a thickness in the range of greater than 0 nm to 1 micron, such as 5 nm to 10 nm, such as 10 nm to 25 nm, such as 10 nm to 15 nm. In another non-limiting embodiment, the protective coating 70 can be a bilayer formed by one metal oxide-containing layer (e.g., a silica and/or alumina-containing first layer) formed over another metal oxide-containing layer (e.g., a silica and/or alumina-containing second layer). The individual layers of the multi-layer protective coating can be of any desired thickness. Non-limiting examples of suitable protective coatings 70 are described, for example, in U.S. patent application Ser. Nos. 10/007,382; 10/133,805; 10/397,001; 10/422,094; 10/422,095; and 10/422,096.

The protective coating 70 can be positioned over the overcoat 60. Alternatively, the protective coating 70 can be positioned under the overcoat 60, for example between the overcoat 60 and the second dielectric layer 50. Or, the overcoat 60 can be eliminated and the protective coating 70 used instead of the overcoat 60, i.e., the protective coating 70 is provided over the second dielectric layer 50.

An optional second primer layer (not shown) can be positioned between the first dielectric layer 40 and the metallic layer 46. The optional second primer layer can be formed of any of the materials described above for the first primer layer 48. For example, the optional second primer layer can be titanium having a thickness in the range of 0.5 nm to 2 nm, such as 1 nm to 2 nm, such as 1.5 nm.

Figure 3:
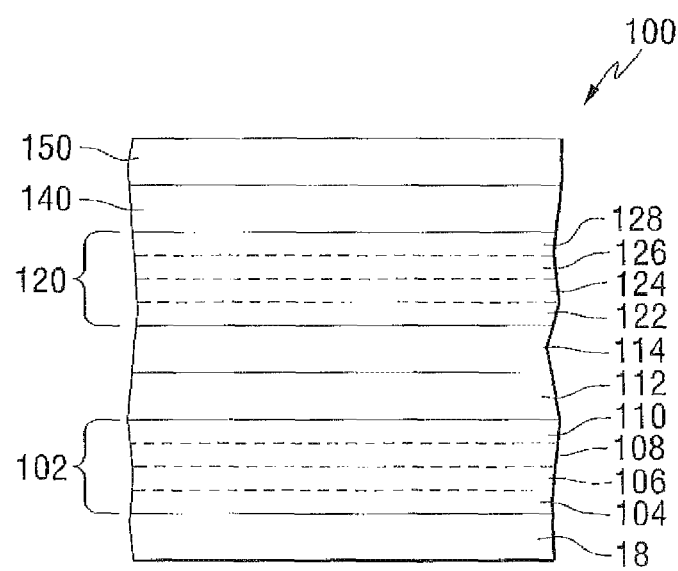
FIG. 3 is a side view (not to scale) of another coating incorporating features of the invention.
Figure 4:
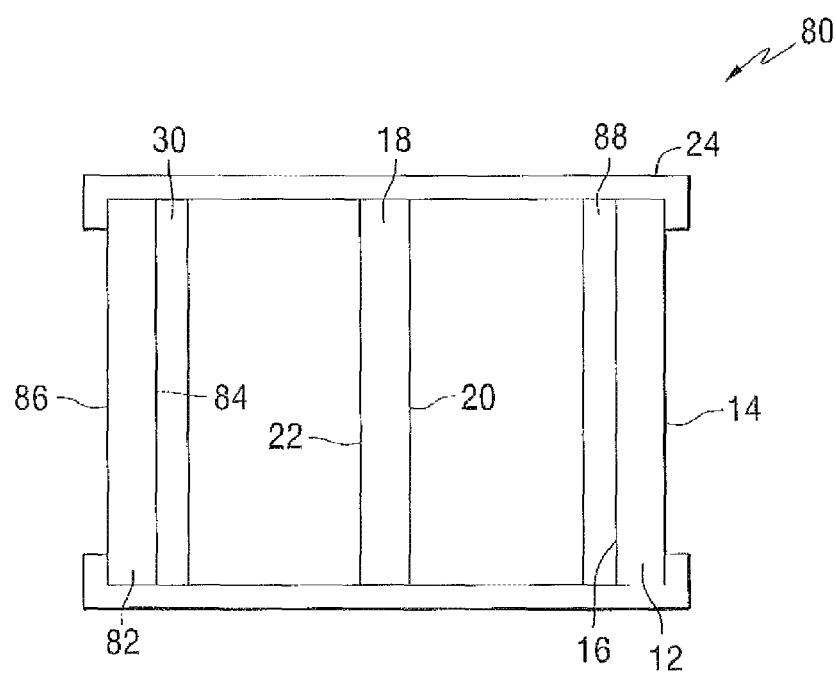
FIG. 4 is a side view (not to scale) of another insulating glass unit (IGU) having a coating of the invention.

Another non-limiting coating 100 of the invention is shown in FIG. 3. This exemplary coating 100 includes a base layer or first dielectric layer 102 deposited over at least a portion of a major surface of a substrate (e.g., the No. 3 surface 20 of the second ply 18). The first dielectric layer 102 can be a single layer or can comprise more than one film of antireflective materials and/or dielectric materials, such as, but not limited to, metal oxides, oxides of metal alloys, nitrides, oxynitrides, or mixtures thereof. The first dielectric layer 102 can be transparent to visible light. Examples of suitable metal oxides for the first dielectric layer 102 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 102 can be a substantially single phase film, such as a metal alloy oxide film, e.g., zinc stannate, or can be a mixture of phases composed of zinc and tin oxides or can be composed of a plurality of films.

The first dielectric layer 102 (whether a single film or multiple film layer) can have a thickness in the range of 20 nanometers (nm) to 70 nm, such as 20 nm to 60 nm, such as 30 nm to 60 nm, such as 40 nm to 55 nm, such as 44 nm to 48 nm, such as 47 nm.

The first dielectric layer 102 can comprise a multi-film structure having a first film 104, e.g., a metal alloy oxide film, a second film 106, e.g., a metal oxide or oxide mixture film, deposited over the first metal alloy oxide film 104, a third film 108, e.g., a metal alloy oxide film, and a fourth film 110, e.g., a metal oxide or oxide mixture film, deposited over the third metal alloy oxide film 104. The first film 104 and the third film 108 can comprise zinc stannate. The second film 106 and fourth film 110 can comprise zinc oxide, for example, 90 wt. % zinc oxide and 10 wt. % tin oxide.

For example, the first film 104 and the third film 108 can be zinc stannate, with each film having a thickness in the range of 5 nm to 25 nm, such as 10 nm to 20 nm, such as 15 nm to 20 nm, such as 15 nm to 17 nm, such as 16 nm to 17 nm. The films do not have to be of the same thickness. The second film 106 and the fourth film 110 can be zinc oxide (for example, 90 wt. % zinc oxide and 10 wt. % tin oxide) and each film can have a thickness in the range of 3 nm to 10 nm, such as 4 nm to 8 nm, such as 5 nm to 8 nm, such as 6 nm to 8 nm. The films do not have to be of the same thickness. For example, the second film can be thicker than the fourth film.

A heat and/or radiation reflective metallic layer 112 is deposited over the first dielectric layer 102 and can be as described above for the metallic layer 46. In one embodiment, the reflective layer 112 comprises metallic silver having a thickness in the range of 3 nm to 8 nm, such as 4 nm to 8 nm, such as 5 nm to 7 nm, such as 6 nm to 7 nm. The metallic layer 112 is a continuous layer.

A primer layer 114 is located over the reflective layer 112. The primer layer 114 can be as described above for the primer layer 48. For example, the primer layer 114 can be titanium and can have a thickness in the range of 0.5 to 5 nm, such as 1 nm to 5 nm, such as 2 nm to 5 nm, such as 3 nm to 4 nm.

A second dielectric layer 120 is located over the reflective layer 112 (e.g., over the first primer layer 114). The second dielectric layer 120 comprises one or more metal oxide or metal alloy oxide-containing films, such as those described above with respect to the first dielectric layer 40. For example, the second dielectric layer 120 can include a first metal oxide film 122, e.g., a zinc oxide film, a second metal alloy oxide film 124, e.g., a zinc stannate film, a third metal oxide film 126, e.g., a zinc oxide film, and a fourth metal alloy oxide film 126, e.g., a zinc stannate film.

The second dielectric layer 120 can have a total thickness (e.g., the combined thicknesses of the layers) in the range of 10 nm to 50 nm, such as 20 nm to 50 nm, such as 30 nm to 50 nm, such as 30 nm to 40 nm, such as 30 nm to 35 nm.

For example, each of the zinc oxide films 122 and 126 can have a thickness in the range of 3 nm to 15 nm, such as 3 nm to 10 nm, such as 3 nm to 5 nm, such as 4 nm to 5 nm. The films do not have to be of the same thickness. The metal alloy oxide (zinc stannate) layers 124 and 128 can have a thickness in the range of 5 nm to 20 nm, such as 5 nm to 15 nm, such as 10 nm to 15 nm, such as 11 nm to 12 nm. The films do not have to be of the same thickness.

An overcoat 140 can be located over the second dielectric layer 120. The overcoat 140 can be as described above for the overcoat 60. For example, the overcoat 140 can be titania having a thickness in the range of 1 nm to 10 nm, such as 2 nm to 8 nm, such as 4 nm to 8 nm, such as 6 nm to 8 nm.

An optional protective coating 150 can be provided. The protective coating 150 can be as described above for the protective coating 70. The protective coating 150 can be positioned over the overcoat 140, under the overcoat 140, or can be used instead of the overcoat 140.

The coating 30, 100 when used to make a reference insulating glass unit ("IGU") having two panes of 3 mm clear glass, a 0.5 inch gap between the two panes filled with argon gas, and the coating 30, 100 on the No. 3 surface of the IGU (i.e. on the outer surface of the inner glass pane) can achieve a performance of SHGC greater than or equal to 0.60, such as greater than or equal to 0.62, such as greater than or equal to 0.63, such as greater than or equal to 0.65, such as greater than or equal to 0.66, such as greater than or equal to 0.67, such as greater than or equal to 0.70, such as greater than or equal to 0.75, and a U-value less than or equal to 0.40, such as less than or equal to 0.38, such as less than or equal to 0.36, such as less than or equal to 0.35, such as less than or equal to 0.34, such as less than or equal to 0.33, such as less than or equal to 0.32, such as less than or equal to 0.30, such as less than or equal to 0.28.

The neutral high transmission coating of the present invention is also well suited as a coating for use in a triple glazed IGU 80, as shown in FIG. 3. The IGU 80 of FIG. 3 is similar to that of the IGU 10 of FIG. 1 but includes a third ply 82 spaced from the second ply 18. The third ply 82 has an outer surface 84 (No. 5 surface) and an opposed second major surface 86 (No. 6 surface). The coating 30 or 100 of the invention can be deposited over the No. 5 surface. Another coating 88 can also be incorporated into the IGU 80. In one non-limiting embodiment, the coating 88 can be the same as the coating 30 or 100. For example, the coating 30 or 100 can be formed over at least a portion of the No. 5 surface and the coating 88 (the coating 30 or 100) can be formed over at least a portion of the No. 2 or No. 3 surface to provide a high SHGC. In another non-limiting embodiment of the invention, to achieve a lower SHGC IGU with high visible light transmission and low U-value, the coating 30 or 100 can be as described above but the coating 88 can be a lower SHGC coating. For example, the coating 88 can include two or more metallic silver layers, such as three or more metallic silver layers, such as four or more metallic silver layers. Examples of suitable lower SHGC coatings include SOLARBAN® 60 coating (including 2 silver reflecting layers) or SOLARBAN® 70XL coating (including 3 silver reflecting layers), both commercially available from PPG Industries Inc. of Pittsburgh, Pa. For example, the coating 30 or 100 of the invention can be positioned on the No. 4 or No. 5 surface of the IGU 80 and the lower SHGC coating 88 can be positioned on the No. 2 surface. The coating 88 can have a lower emissivity than the coating 30 or 100. For example, the coating 30 or 100 of the invention has an emissivity of less than or equal to 0.15, such as less than or equal to 0.1. The second coating 88 can have an emissivity of less than or equal to 0.1, such as less than or equal to 0.05.

The following Examples illustrate various embodiments of the invention. However, it is to be understood that the invention is not limited to these specific embodiments.

EXAMPLES

Table 1 illustrates embodiments of a coating stack of the present invention. In each example, the reflective layer is silver, the primer layer is titanium oxide, the protective layer is titanium oxide, and the dielectric layers include sublayers of $Zn_2SnO_4$ and ZnO (90 wt. % zinc oxide and 10 wt. % tin oxide), wherein the ZnO sublayer is positioned toward the silver layer. The ZnO sublayer is in the range of 5 to 15 nm. The performance data for each coating is based on an argon gas filled IGU configured as described above. The color coordinates a*, b*, and L* are those of the conventional CIE (1931) and CIELAB systems that will be understood by one of ordinary skill in the art. The color of the coatings is neutral to blue in reflection. The SHGC and U-values are for the reference IGU described above.

The coating stacks in Examples 1 and 3 are for an annealed glass product, i.e., the coated glass is not heated to the tempering temperature of the glass substrate 10 (approximately 1200° F.). If the coating is heated to the tempering temperature of the glass substrate, the coating stack will break down and exhibit a haze. The coating stacks in Examples 2 and 4 are for a tempered glass product, i.e., the coating reaches the desired performance characteristics after tempering of the coated glass substrate.

TABLE 1

| Coating Stack | Layer Thickness (nm) | | | | |
|---|---|---|---|---|---|
|  | Ex. 1 | Ex. 2 | Ex. 3 | Ex. 4 | Range |
| 1st Dielectric Layer | 44.9 | 47.6 | 45.1 | 47 | 40-55 |
| Reflective Layer | 6.8 | 7 | 6.9 | 6.9 | 5.5-8.5 |
| Primer | 1.4 | 4.5 | 1.4 | 4.5 | 0.5-6 |
| 2nd Dielectric Layer | 35 | 29.3 | 36.2 | 30.9 | 15-45 |
| Protective Layer | 5 | 6.9 | 5 | 6.9 | 0-15 |
| Performance | | | | | |
| SHGC | 0.68 | 0.68 | | | |
| U-value | 0.27 | 0.27 | | | |
| Color on monolithic clear glass | | | | | |
|  | T | Rf | Rg | | |
| Ex. 1 | | | | | |

TABLE 1-continued

| | | | |
|---|---|---|---|
| L* | 94.7 | 30.5 | 32.5 |
| a* | −1.0 | −1.2 | −1.8 |
| b* | 1.1 | −1.9 | −5.1 |
| Ex. 2 | | | |
| L* | 94.4 | 30.4 | 32.8 |
| a* | −0.6 | −0.4 | −1.2 |
| b* | 1.2 | −2.2 | −6.9 |
| Ex. 3 | | | |
| L* | 94.6 | 30.4 | 32.7 |
| a* | −1.1 | −0.5 | −1.5 |
| b* | 1.3 | −3.9 | −6.4 |

"T" means transmitted color
"Rf" means reflected color from the film side
"Rg" means reflected color from the glass side A coating stack of the type shown in annealed Examples 1 and 3 can be matched with respect to its color and performance with a temperable coating with similar layers, e.g., of the type shown in Examples 2 and 4. However, to achieve the match, (a) the thickness of the primer layer 48 of the annealed coating is increased (e.g., comparing Example 1 to Example 2, the primer layer 48 thickness is roughly doubled) to allow the primer layer to getter oxygen during heating, (b) the thickness of the protective layer 60 of the annealed coating is increased to provide additional durability, and (c) the thickness of the second dielectric layer 50 of the annealed coating is reduced to compensate optically for the increased thickness of the primer layer 48 and the protective layer 60.

Example 5

A coating was modeled having the following structure:

TABLE 2

| material | thickness (nm) |
|---|---|
| zinc stannate | 16.6 |
| zinc oxide | 7.6 |
| zinc stannate | 16.6 |
| zinc oxide | 6.8 |
| metallic silver | 6.4 |
| titanium | 3.4 |
| zinc oxide | 4.7 |
| zinc stannate | 11.4 |
| zinc oxide | 4.3 |
| zinc stannate | 11.7 |
| Titania (overcoat) | 7.3 |

The coating had the following color coordinates:

TABLE 3

| | T | Rf | Rg |
|---|---|---|---|
| L* | 95.2 | 29.7 | 31.4 |
| a* | −0.7 | −0.7 | −1.4 |
| b* | 1.3 | −3.4 | −6.6 |

This coating provided reference IGU values of 0.27 SHGC and 0.68 U-value.

It should be appreciated that the SHGC can be increased further by using low-iron glass, e.g., STARPHIRE® glass, Solarphire® glass, and Solarphire PV® glass, all commercially available from PPG Industries, Inc., Pittsburgh, Pa., as one or more of the glass panes in the IGU, such as the outer pane. In addition, the U-value can be affected by the choice of gas in the air gap, e.g., switching the gas from argon to air will increase the U-value.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A coated transparency, comprising:
   a. a first substrate having a No. 1 surface and a No. 2 surface;
   b. a second substrate spaced from the first substrate, with a gas-filled gap between the first substrate and the second substrate, the second substrate having a No. 3 surface and a No. 4 surface, with the No. 3 surface facing the No. 2 surface; and
   c. a coating formed over at least a portion of the No. 3 surface and defining a side of the gas-filled gap opposite the No. 2 surface, the coating comprising;
      i. a first dielectric layer formed over at least a portion of the No. 3 surface, wherein the first dielectric consists of a first film, and a second film in direct contact over at least a portion of the first film;
      ii. a continuous metallic layer formed over at least a portion of the first dielectric layer, the metallic layer having a thickness less than 8 nm;
      iii. a primer layer formed over at least a portion of the metallic layer;
      iv. a second dielectric layer formed over at least a portion of the primer layer; and
      v. an overcoat formed over at least a portion of the second dielectric layer,
         wherein the coated transparency has a solar heat gain coefficient greater than or equal to 0.6 and a heat transfer coefficient less than or equal to 0.35, and wherein the gas-gap is filled with air or a non-reactive gas.

2. The coated transparency of claim 1, wherein the first film comprises zinc alloy oxide and wherein the second film comprises metal oxide; and wherein the first dielectric layer has a thickness in the range of 40 nm to 50 nm.

3. The coated transparency of claim 2, wherein the second film has a thickness in the range of 3 nm to 15 nm.

4. The coated transparency of claim 1, wherein the metallic layer comprises silver having a thickness less than or equal to 7.5 nm.

5. The coated transparency of claim 1, wherein the second film comprises zinc oxide_and the first film comprises zinc stannate, and wherein the second dielectric layer has a thickness in the range of 30 nm to 40 nm.

6. The coated transparency of claim 5, wherein the second film has a thickness in the range of 3 nm to 15 nm.

7. The coated transparency of claim 1, wherein the overcoat comprises titania and has a thickness in the range of 2 nm to 6 nm.

8. The coated transparency of claim 1, wherein the first film comprises zinc stannate and the second film comprises zinc oxide.

9. The coated transparency of claim 8, wherein the first dielectric layer has a thickness in the range of 44 nm to 48 nm, the first film has a thickness in the range of 16 nm to 17 nm, and the second film has a thickness in the range of 6 nm to 8 nm.

10. The coated transparency of claim 1, wherein the second dielectric layer comprises a first film comprising zinc oxide_and a second film comprising zinc stannate.

11. The coated transparency of claim 10, wherein the second dielectric layer has a thickness in the range of 30 nm to 35 nm, the first film has a thickness in the range of 3 nm to 5 nm, and the second film has a thickness in the range of 11 nm to 12 nm.

12. The coated transparency of claim 1, wherein the second substrate is a glass substrate,
   wherein the first dielectric layer has a thickness in the range of 40 nm to 50 nm, the second film has a thickness in the range of 3 nm to 15 nm, and the first film has a thickness in the range of 25 nm to 40 nm,
   wherein the metallic layer comprises silver having a thickness less than or equal to 7.5 nm,
   wherein the primer film comprises titanium,
   wherein the second dielectric layer comprises a zinc oxide film and a zinc stannate film deposited over the zinc oxide film, the second dielectric layer has a thickness in the range of 30 nm to 40 nm, and the zinc oxide film has a thickness in the range of 3 nm to 15 nm,
   wherein the overcoat has a thickness in the range of 2 nm to 6 nm and the overcoat comprises titania, and
   wherein the solar heat gain coefficient is greater than or equal to 0.65 and the heat transfer coefficient is less than or equal to 0.33.

13. The coated transparency of claim 1, wherein the second substrate is a glass substrate,
   wherein the first film comprises zinc stannate, and the second film comprises zinc oxide, wherein the first dielectric layer has a thickness in the range of 44 nm to 48 nm, the first film has a thickness in the range of 16 nm to 17 nm, and the second film has a thickness in the range of 6 nm to 8 nm,
   wherein the metallic layer comprises silver having a thickness less than or equal to 7 nm,
   wherein the primer film comprises titanium,
   wherein the second dielectric layer comprises a first film comprising zinc oxide, a second film comprising zinc stannate, wherein the second dielectric layer has a thickness in the range of 30 nm to 35 nm, the first film has a thickness in the range of 3 nm to 5 nm, and the second film has a thickness in the range of 11 nm to 12 nm,
   wherein the overcoat has a thickness in the range of 5 nm to 10 nm and the overcoat comprises titania, and
   wherein the solar heat gain coefficient is greater than or equal to 0.65 and the heat transfer coefficient is less than or equal to 0.35.

* * * * *